(12) United States Patent
Bliton et al.

(10) Patent No.: US 6,496,309 B1
(45) Date of Patent: Dec. 17, 2002

(54) AUTOMATED, CCD-BASED DNA MICRO-ARRAY IMAGING SYSTEM

(75) Inventors: Allison Christyne Bliton, East Lansing, MI (US); Claus Werner Buchholz, Haslett, MI (US); Richard Lawrence Fisher, Ann Arbor, MI (US); George Harold Byrkit, Dexter, MI (US); David Carter, Jackson, MI (US)

(73) Assignee: Genomic Solutions, Inc., Ann Arbor, MI (US)

( * ) Notice: Subject to any disclaimer, the term of this patent is extended or adjusted under 35 U.S.C. 154(b) by 0 days.

(21) Appl. No.: 09/596,391

(22) Filed: Jun. 16, 2000

Related U.S. Application Data

(60) Provisional application No. 60/139,948, filed on Jun. 18, 1999.

(51) Int. Cl.[7] .................. G02B 27/10; G02B 21/00; G02B 21/18
(52) U.S. Cl. .................. 359/618; 359/368; 359/372
(58) Field of Search .................. 359/618, 368, 359/372, 381, 384; 250/458.1, 462.2; 356/417, 418

(56) References Cited

U.S. PATENT DOCUMENTS

| | | | | |
|---|---|---|---|---|
| 3,916,205 A | * | 10/1975 | Kleinerman | 250/461 |
| 4,722,598 A | * | 2/1988 | Ford | 359/398 |
| 4,945,250 A | * | 7/1990 | Bowen et al. | 250/461.1 |
| 5,512,490 A | * | 4/1996 | Walt et al. | 436/171 |
| 6,096,510 A | * | 8/2000 | Hochman | 435/29 |

FOREIGN PATENT DOCUMENTS

| | | | | |
|---|---|---|---|---|
| JP | 404086615 A | * | 3/1992 | G02B/21/36 |
| JP | 407055566 A | * | 3/1995 | G01J/3/45 |
| JP | 410024283 A | * | 1/1998 | C02F/1/00 |
| WO | WO 00/12759 | | 3/2000 | |

* cited by examiner

Primary Examiner—Ricky Mack
(74) Attorney, Agent, or Firm—Rader, Fishman & Grauer PLLC

(57) ABSTRACT

An automated CCD-based imaging system is disclosed which may be used for the automated acquisition, compilation, and analysis of images of fluorescently labeled samples of different types, including fluorescently-labeled gene chip arrays.

66 Claims, 5 Drawing Sheets

*Converging Illumination Beam:*
The illumination is paler near the prism.

*Diverging Beam:*
The illumination is brighter near the prism.

*Collimated Beam:*
The illumination is even across the field.

Camera Lens Pupil Plane | Camera Lens Mount Surface | Image Plane

*All dimensions are in mm*

| Surface | Radius of Curvature | Thickness | Glass | Diameter |
|---|---|---|---|---|
| 1 | Infinity | 33 | air | 70 |
| 2 | Infinity | 68.1 | air | 100 |
| 3 | -36.657 | 20 | BK7 | 70 |
| 4 | -48.251 | 0.5 | air | 80 |
| 5 | -800.099 | 17.307 | SK16 | 100 |
| 6 | -91.495 | 0.5 | air | 100 |
| 7 | 137.228 | 25 | BK7 | 100 |
| 8 | -90.009 | 6 | SF11 | 100 |
| 9 | -1094.093 | 0.5 | air | 90 |
| 10 | 49.380 | 20 | BK7 | 90 |
| 11 | 39.152 | 88.7 | air | 70 |
| 12 | Infinity | | | |

AUTOMATED, CCD-BASED DNA MICROARRAY IMAGING SYSTEM

CROSS-REFERENCE TO RELATED APPLICATION

This application claims priority based on U.S. provisional patent application No. 60/139,948 filed Jun. 18, 1999.

FIELD OF THE INVENTION

This invention relates to imaging systems. In particular, the invention relates to imaging systems used for the acquisition, compilation, and analysis of fluorescent images.

BACKGROUND OF THE INVENTION

The system described herein is used for the automated acquisition, compilation, and analysis of images of fluorescently labeled samples of different types (the "Invention"). Many areas of scientific investigation require the use of imaging equipment. For example, in the field of genomics research, imaging equipment is used to acquire, compile, and analyze the results from testing of deoxyribonucleic acid ("DNA") "microarrays" (also know as "gene chip arrays", "biochips", and other designations).

Microarrays are prepared as a means to match known and unknown DNA samples based on hybridization principles, for example, to identify gene sequences or to determine gene expression levels. In one method, microarrays can be made by "spotting" collections of suspended, purified DNAs onto a substrate. In a typical production method, a microarray robot places drops of individual DNA types onto a substrate, such as a glass slide, in a grid design. The grid may contain thousands of DNA spots of different base pair sequences that are fixed to the substrate. cDNA "probes" are then tested by hybridizing them to the prepared DNA microarray. If an individual cDNA probe is complementary to the sequence of DNA on a given spot, the cDNA will hybridize to the spot and the hybridization may be detected by its fluorescence. In this manner, each spot in the microarray may act to assay the presence of a different cDNA.

After the cDNA probes have hybridized to the microarray and any free probe has been removed, the microarray may be scanned to evaluate the comparative binding levels of individual probes. cDNA probes hybridized to DNA spots in the microarray may be detected through the use of different colored fluorophores or dyes that emit light at differential, characteristic wavelengths when excited by an illumination source. Microarray spots with more bound probe will fluoresce more intensely. The emitted light is captured by a detector, such as a charge-coupled device (CCD) or a photomultiplier tube (PMT), which records its intensity. The recorded data is stored or processed for further analysis. The detector for fluorescence emitted from the microarray is sensitive to the emission wavelength but filters out the excitation wavelength; in this way, the fluorescent emission of interest can be separated from the excitation light scattered off the substrate.

The use of robotically-prepared microarrays has increased the need for automated equipment to more quickly and accurately process and analyze test samples. Such automated equipment must be able to handle a high volume of samples with consistent and reproducible results. It is also desirable to have means to selectively filter emission and excitation wavelengths with reduced crosstalk between channels. It is also desirable to have reduced background in the scanned image, to be able to determine intensity thresholds, and to have more uniform detection efficiency across a scanned sample.

In contrast to existing systems that typically can accommodate only one test sample, the present Invention is fully automated and accommodates up to twenty-four samples on substrates, for example, on glass slides. The Invention's CCD/arc lamp embodiment permits faster imaging than a stage-scanning instrument (such as General Scanning ScanArray 3000) because it uses full-field illumination and CCD detection. Depth of focus is deep enough to accommodate the added thickness of a glass cover slip on top of the sample, and allows for some variation in the height at which the sample is presented to the imaging system by the rotary stage. The Invention also permits the use of a large number of fluorophores at a lower cost than a laser-scanning instrument (such as Molecular Dynamics Avalanche and the GeneFocus DNAscope) because a new excitation band from the wide spectral band of the Invention's arc lamp excitation source can be introduced through a simple filter change, in contrast to the introduction of an additional laser required in a laser-based system. The Invention also accommodates a straightforward extension of the dynamic range with a multiple exposure algorithm, which is much more difficult on a PMT-based system (General Scanning ScanArray 3000, Molecular Dynamics Avalanche, GeneFocus DNAscope) due to the non-linear nature of the PMT's.

SUMMARY OF THE INVENTION

The Invention is a CCD and arc-lamp-based system used for the acquisition of fluorescent images, which can be optimized for imaging fluorescently labeled cDNA spotted on multiple glass slides. The Invention may also be applied in other uses, for example, to image other fluorescently labeled material, including proteins on other substrates, including gels and membranes, and for imaging histological or toxicology slides. With the excitation light blocked or turned off, the invention can also be used to image light emitting samples, such as chemiluminescently labeled materials, or radioisotopes in close proximity to a scintillating substrate.

The Invention uses a unique illumination and detection optical system that minimizes background from its high intensity arc-lamp illumination and thus allows detection of low-level fluorescence from the sample with a high-QE CCD detector.

The Invention incorporates a number of automated features, including automated presentation of multiple test samples to the viewing area by user-selected criteria; auto-exposure of test samples, which allows walk-away use of the instrument while imaging multiple samples; automated illumination-variation correction; and an automated technique for extending the dynamic range of the Invention past the bit depth of the CCD.

The optical system of the Invention allows for high-speed (approximately <1 sec.) collection of images from bright samples with the CCD camera, and also allows longer integration times for collecting low-level fluorescence. Full-field illumination, in combination with integrating detection on the CCD, allows for low-fluorescence image collection, while minimizing fluorophore damage and bleaching, as compared to laser scanning systems. The optical system also allows for viewing a large area (approximately 30×40 mm) while eliminating sufficient background from the arc lamp to view low-level fluorescence. The arc lamp supplies a full spectrum of excitation light that can be adapted for different fluorophores by changing the waveband of the filters, whereas laser systems are limited to specific excitation lines. The linear behavior of the CCD detection allows for a straightforward method to increase the dynamic range of the image data by taking multiple exposures of the sample.

BRIEF DESCRIPTION OF THE DRAWINGS

The features and inventive aspects of the present Invention will become more apparent upon reading the following detailed description, claims, and drawings, of which the following is a brief description:

DETAILED DESCRIPTION OF A PREFERRED EMBODIMENT

In a preferred embodiment, the Invention is a CCD and arc lamp based imaging system for fluorescently-labeled genechip arrays, although one of ordinary skill in the art will appreciate that the Invention could also be used to image other types of samples. The Invention includes automated means, such as a rotary stage under microprocessor control 1, for transporting a plurality of samples to be imaged through a viewing area 2. Basic means for controlling movement of such a stage using electronic commands generated by a microprocessor will be known to one of ordinary skill in the art. The Invention includes an illumination system that floods the viewing area with intense excitation light from a narrow wave band. Narrow waveband filters are used to eliminate cross-talk and consequent quantitation errors in samples that are stained with multiple fluorophores. The illumination system provides sufficient intensity to acquire weakly fluorescent images with a cooled CCD in approximately 0-10 minutes, with wavelengths from ultraviolet through visible and near-infrared. The Invention also has means to reduce scattered excitation light and to reduce background in the scanned image, for example, from excitation light power that is many orders of magnitude brighter than the fluorescence that is collected. The Invention allows a field illumination with no more than 50% drop-off at the edges to allow a maximum of 1 bit dynamic range reduction from field variation. The Invention may also include microprocessor capability (not shown) to conduct sample exposure, to accumulate, manipulate, and analyze data, and to control machine function, as well as software algorithms to automatically measure and correct the field variation.

The system design of the Invention allows introduction of fluorescence filters with extreme out-of-band rejection properties that eliminate the excitation light from the arc lamp in the fluorescence image. The design also allows for the elimination of "ghost images" from multiple reflections caused by the fluorescence filters and other optical components.

In a preferred embodiment, the Invention includes auto-exposure algorithms that allow ease of automation when working with multiple slides. An automated, multiple exposure, extended dynamic range algorithm is used as part of the Invention in view of the fact that genechip samples can have a dynamic range of 500,000:1, well above the 12-bit capabilities of a typical high-end cooled CCD camera or PMT-based imager.

Figure 1:
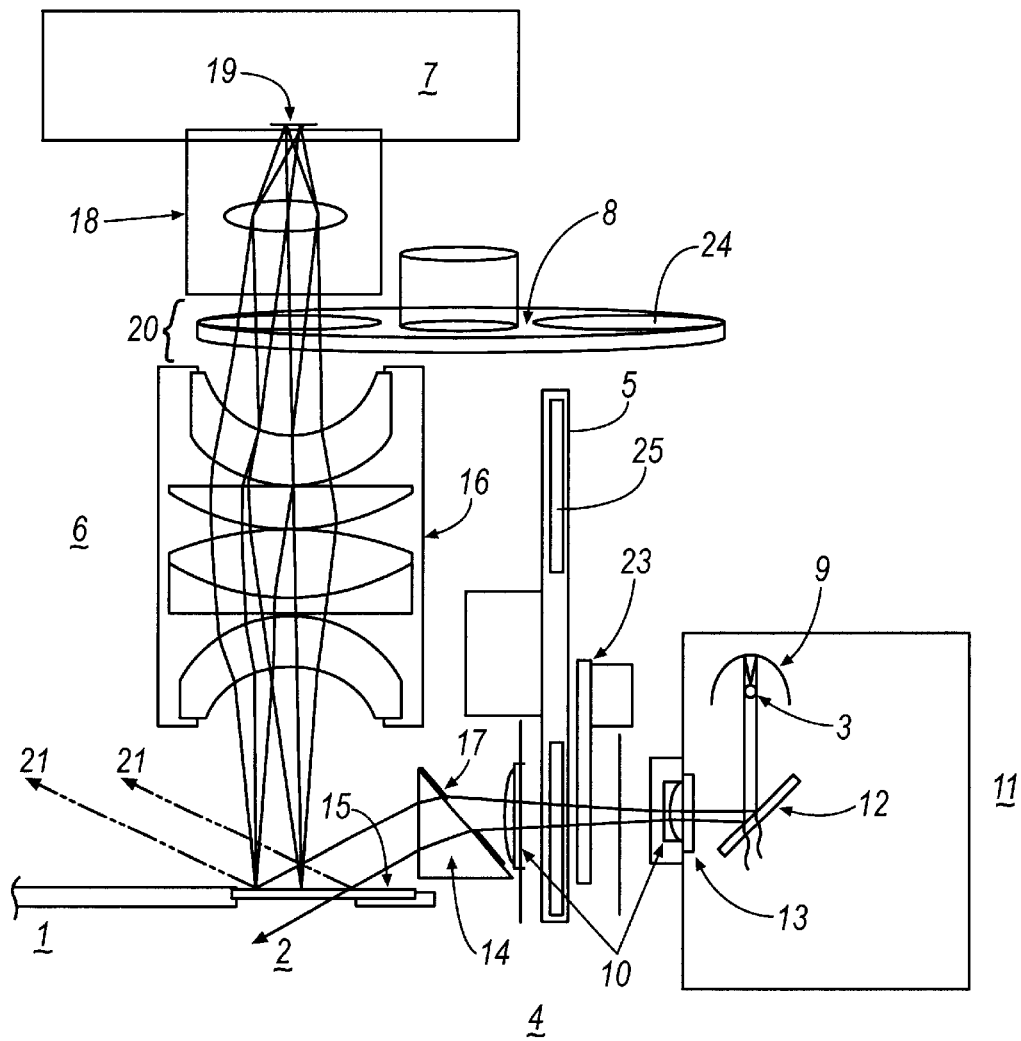
FIG. 1 is a diagram of the basic elements of the Invention.

By way of example, as shown in FIG. 1, a preferred embodiment of the Invention may include an optical system comprised of a collimated arc-lamp 3 that provides excitation light; an optical sub-system 4 to deliver the arc-lamp light to the sample; an excitation filter wheel 5 that selects for the correct waveband of excitation light for the fluorophore of interest; an optical sub-system 6 to image the fluorescent signal onto a cooled CCD camera 7; and an emission filter wheel 8 that picks off the fluorescence waveband of interest, eliminates cross-talk from other fluorophores, and rejects excitation from the arc lamp.

The Invention may use an arc lamp 3 as the excitation source due to its large output of excitation light from a near-point source (the arc). In one embodiment, the arc lamp is a Xenon arc lamp, chosen for its broad, flat spectrum, and high powers, although other types of arc lamps could be substituted, including a high-power, pulsed arc lamp for fluorescence lifetime imaging or other applications. The arc-lamp light is collimated by mirror 9, and a cross-section of the collimated beam gives a beam profile that is fairly flat in the middle. A collimated telescope 10 may be used to broaden the beam profile in order to match it to the size of the sample, and to allow a maximum of approximately 50% illumination drop-off at the edges of the sample field of view. The smaller the arc is, the more it will behave like a point source, causing the beam profile to be flatter. In another embodiment, an arc lamp with a smaller arc, such as a Mercury arc lamp, may be used to obtain a flatter illumination profile, at the cost of spectrum flatness. A shutter 23 is incorporated to control or prevent transmission of excitation light, for example, to prevent illumination when data is not being collected.

The arc lamp box 11 may include a cold mirror 12 to reflect excitation light towards the sample and to pass heat. An additional hot mirror 13 may be added to reject remaining heat from the arc lamp in order to preserve the optics in the instrument and to avoid heating up the camera, which could add noise to the images. The heat is contained in the arc lamp box and is eliminated through the back of the instrument with fans (not shown).

Figure 2A:
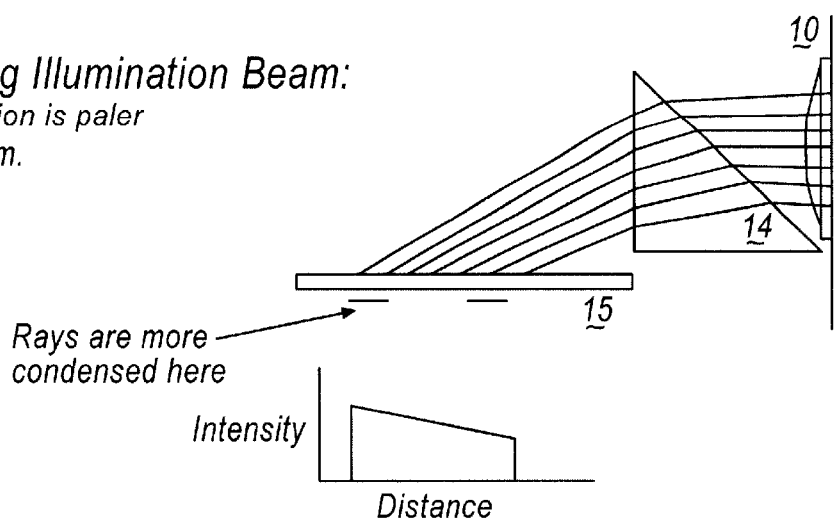
FIG. 2 is a diagram showing the effects of a collimated illumination beam.
Figure 2B:
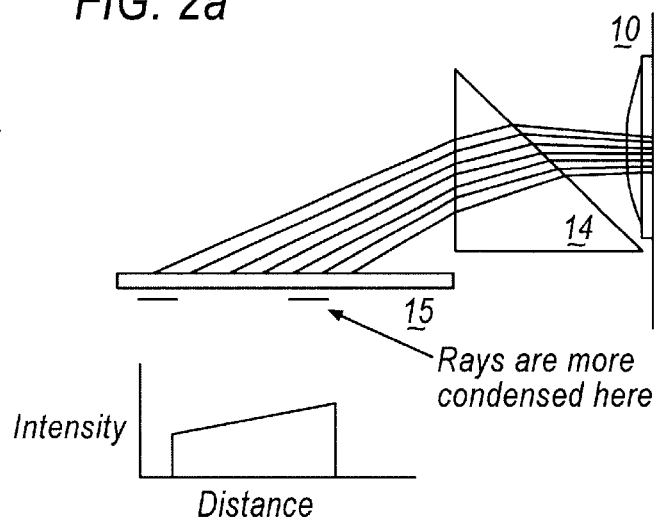
Figure 2C:
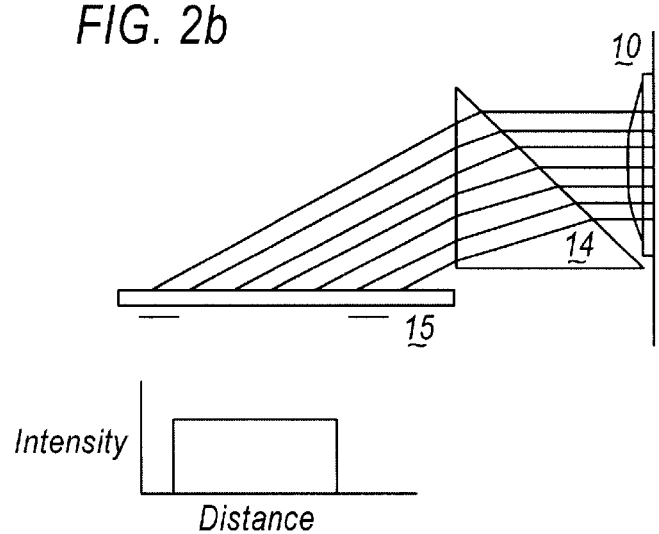

In a preferred embodiment, the Invention uses a prism 14 to deflect the collimated beam at a shallow angle towards the sample. A telescope 10 collimates the beam approaching the prism in order to maintain an even illumination distribution along the length of the sample. As shown in FIG. 2, if the beam is diverging, the illumination will be brighter near the prism, and if it is converging, the illumination will be brighter away from the prism.

The prism 14 reflects the arc lamp light off of the sample slide 15 at a shallow angle (FIG. 1). The reflected light 21 then passes out of view of the custom imaging lens 16, minimizing light scatter that the fluorescence filters must reject.

Light that passes through the slide is dumped underneath the stage, through holes in the stage 1. The dumped light is again out of view of the imaging lens, further minimizing excitation light scatter and enhancing the dark field-type illumination of the invention. A mask 17 is placed directly on the prism to mask off any excitation light that is not required to impinge directly on the field of interest in the sample. This approach further minimizes light scatter.

In a preferred embodiment, an imaging lens 16 is included to work in conjunction with an off-the-shelf camera lens 18

(including multiple elements not shown) and to demagnify the sample object to the correct size to fit on the CCD chip 19. This embodiment maximizes the numerical aperture and moves the camera and camera lens close to the sample. The imaging lens collimates the light between it and the camera lens and places the pupil plane inside the camera lens to reduce vignetting. The lens includes a pupil plane to match the pupil plane of the camera lens and to allow the camera lens to be used at infinity, thus allowing the camera lens to be used at its optimal design parameters.

Figures 3A, 3B:
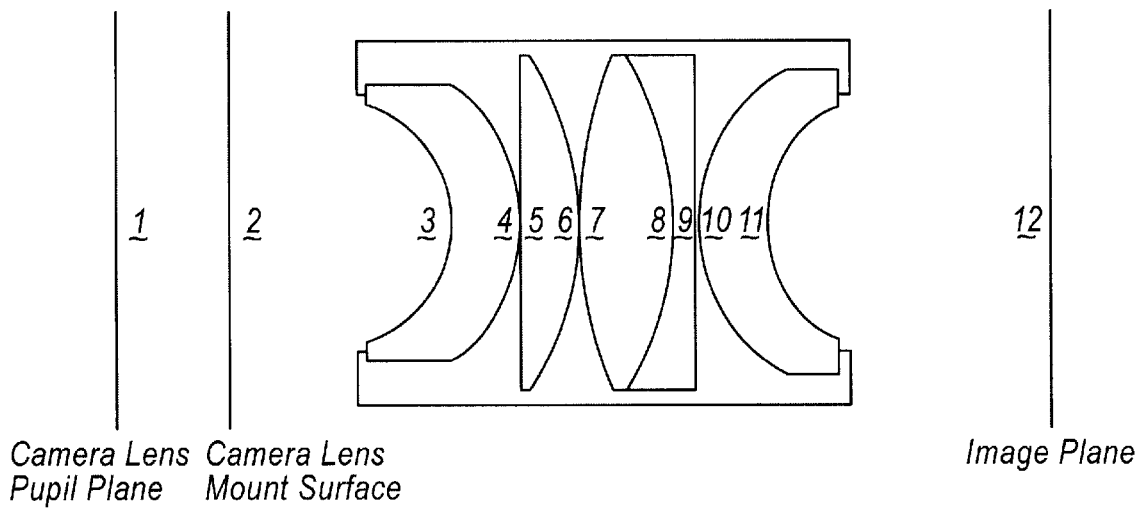
FIG. 3 is a diagram of an embodiment of an imaging lens of the Invention.

By way of example, the design parameters and actual design of the imaging lens are described in FIG. 3. In a preferred embodiment, the imaging lens pupil plane and the camera lens pupil plane are coincident at surface number 1. The image plane is at surface 12. The imaging lens consists of four air-spaced lens elements. Three elements are singlets, and one is a cemented doublet. The focal length of the lens in this embodiment is approximately 116.6 mm, and the speed is approximately F/5.3. This embodiment works optimally with a Nikon 28 mm F/1.4 camera lens. The imaging lens is color corrected, with a flat field, and corrected for distortion, by way of example, for monochromatic and chromatic errors in the range of approximately 520 to 700 nm, over a field size approximately 37.5×29.2 mm, for approximately a 1317×1025 array of 28.3 micron pixels.

Figure 4:
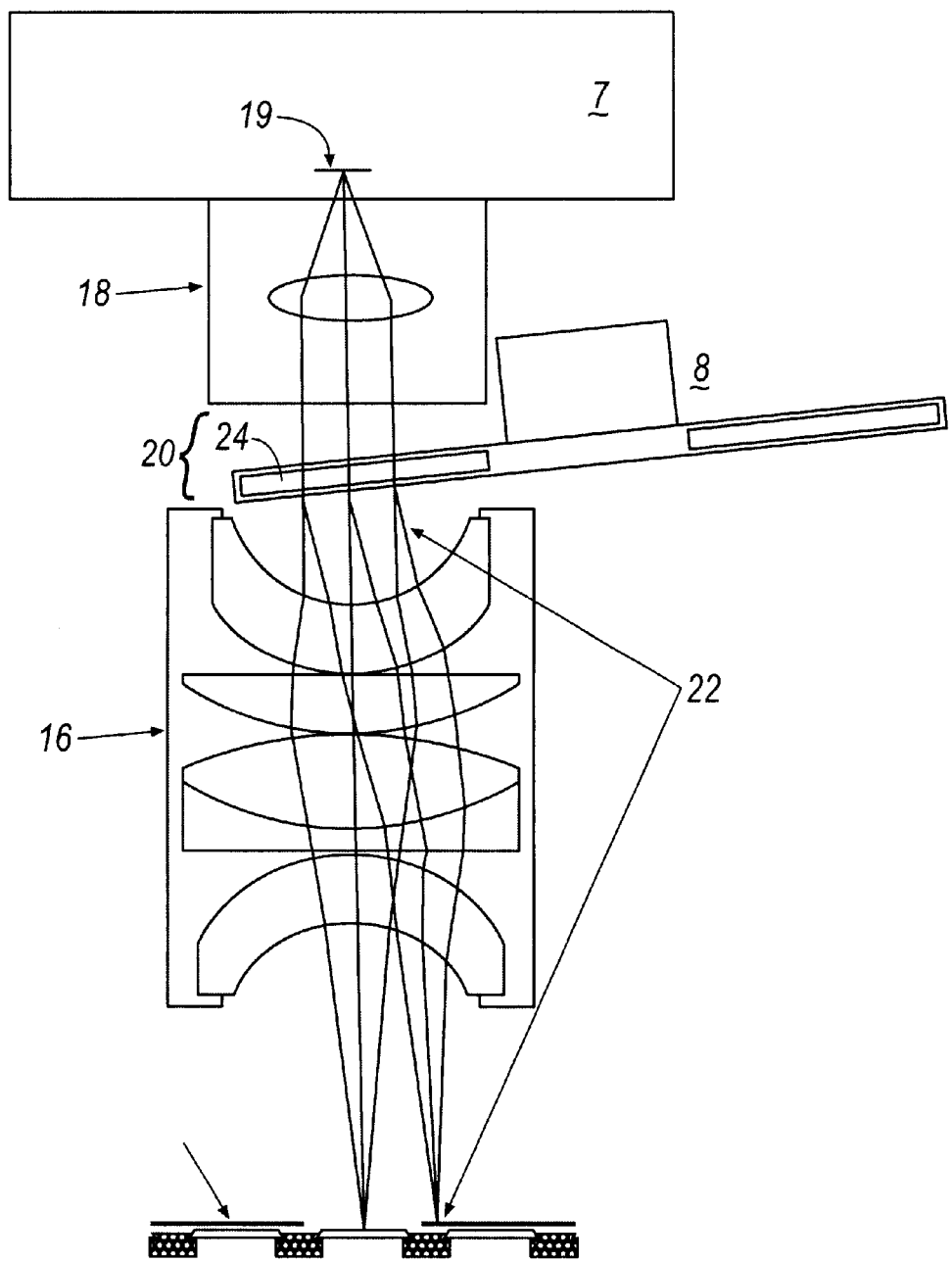
FIG. 4 is a diagram showing the prevention of ghost images by an embodiment of the Invention.

The imaging lens 16 (FIG. 4) may include a large distance between the lens and the pupil, thus allowing for introduction of filters 24 into a parallel path 20 in the optical system. The Invention may use a high-QE, Peltier-cooled CCD camera 7, although other types of cameras, including without limitation, an anti-blooming CCD camera, could also be used.

In a preferred embodiment, the Invention includes an excitation filter wheel 5 with filters 25 to select the desired excitation waveband (FIG. 1), and an emission filter wheel 8 with filters 24 to select desired fluorescence waveband. The filters are designed to have from approximately $10^8$ to $>10^{10}$ blocking when the excitation and emission filters are crossed, over the spectrum of the arc lamp. This severe blocking specification is required to eliminate scattered light from the arc lamp, which is many orders of magnitude larger than the fluorescent light levels that are being studied. The band passes on the filters are narrow enough to eliminate cross-talk between particular fluorophores that have been shown to be optimal for genechip microarrays. A typical excitation or emission filter has approximately a 25–35 mm band-pass, and a typical excitation filter passes approximately 24 mW of arc lamp light in this particular reduction to practice. The Invention uses fluorescence filters designed with sufficient flatness specification to allow imaging through them.

In one embodiment, the Invention contains an optical system designed to allow a parallel path region 20 (FIG. 1) of collimated light to introduce the fluorescence imaging filters on the filter wheel 8. Fairly thick, parallel-plate filters are used in this region with minimal effect on the final image quality, while allowing for the extreme blocking specifications. The filters can also be tilted in this region to eliminate ghost images from back reflections 22 (FIG. 4), while minimally affecting image quality. The incident angles of light on the filters are minimized in this region 20 (approximately less than +/−15 degrees), aiding in the design of the extreme blocking filters.

In a preferred embodiment, the Invention uses microprocessor capability with software that multiplies the image, pixel-by-pixel, by a correction map in order to cancel the effect of non-uniform illumination of the sample in a fluorescence scanner. Ideally, the correction map is the reciprocal of the illumination pattern, normalized so that the most brightly illuminated part of the field corresponds to a map value of unity. Therefore, applying the correction map can never decrease the pixel value, preventing the problem of reducing saturated data to a false, non-saturated level. In practice, calibration software calculates the correction map from an image of a uniformly fluorescent sample scanned by the user. To reduce the adverse effects of noise in the image and imperfections in the sample, the software highly smoothes the image, as follows: it divides the image into N by N blocks and averages the reciprocal pixel values within each block, giving an N by N array of correction factors. To reduce edge effects in the final map, the software extrapolates the array's edge values to produce an N+2 square array. Then it fits an N+1 order polynomial to each row in the array, giving an N+2 square array of coefficients. Next it fits an N+1 order polynomial to each column of coefficients. The choice of N determines the degree of smoothing. N should be odd in the case of centrally bright illumination, which is better approximated by even order polynomials. Finally, the software uses these polynomials to interpolate the values for the full correction map and normalizes the map.

In one embodiment, microprocessor capability using an auto-exposure algorithm allows automated walk-away use of the system. For the sake of simplicity, speed, and consistency across imaging systems capable of returning images of multiple bit depths (some greater than 8 bits grayscale), only the 8 most significant bits of the image data are used in these calculations. An initial exposure of short duration is taken. In one embodiment, the short exposure is typically set to approximately 0.1 seconds. A histogram is formed from the pixel intensity data acquired in the image (each of the values 0 to 255 is enumerated for how many times it occurs in the image). A percentage point is chosen by the user and located in the histogram, indicating that the given percentage of pixels have intensities lower than the pixel at the percentage point location. The intensity of the desired maximum brightness of the image is divided by the intensity of the percentage-point pixel, and a scale factor is calculated form the ratio. The scale factor can be multiplied by the initial exposure time, to bring the brightest pixels up to near-saturation, because the CCD's intensity increase is linear with exposure time. If the brightest pixels in the initial image are too close to the noise floor of the image, the algorithm may not scale the exposure time accurately, because the first (approximately 0.1 sec) exposure is dominated by noise factors that do not scale with exposure time. In this case, the auto-exposure process is repeated a second time, using the calculated auto-expose time as the initial exposure time for the second round. This approach results in a substantial increase in accuracy and ability to properly image faint, low fluorescence images at an idealized dynamic range. Both the high-intensity threshold, and the noise floor threshold are user-settable in the reduction to practice, allowing adaptation of the algorithm to different types of samples, with different amounts of background. If the initial (0.1 sec) exposure is too bright, and more pixels are saturated than desired, the initial exposure time is divided by a factor of ten, and the process is repeated.

In one embodiment, using microprocessor capability, the Invention accommodates the extended dynamic range of genechip samples (as much as 500,000:1) by taking multiple exposures of a genechip array at different exposure times, and combining the information from the images into one image, or into one set of data. The auto-expose feature of the Invention allows it to automatically determine the shortest exposure time for the brightest objects in the 12-bit image. To gain four more bits of data, the exposure time is increased by a factor of 16, and another image is collected. In this second image, the brightest objects saturate, and objects that were too pale to see in the first image become visible. The exposure time can be increased to a longer time, or more images can be collected at the 4-bit increments, until the desired dynamic range is achieved, i.e. 16-bit, 20-bit, or more. The exposure time may extend to a time that is long enough for the background in the image, or the noise of the camera to become larger than four bits. If this is the case, the algorithm has reached the limit of the low end of the dynamic range, and is stopped.

In one embodiment, the Invention uses two approaches to combine the information in the images. The individual images can be analyzed first, and the intensities of the cDNA spots can be quantified. Then the data can be scaled and combined to reflect its full dynamic range. Alternatively, the images can be scaled and combined first, into a single, full-dynamic range image. Then the cDNA spots in that image can be analyzed and quantified.

The Invention may include means to reduce problems that can occur in the combination of images such as "blooming" from overly saturated spots, and bleaching of the image at long exposures. Blooming causes pixels that are proximate to a saturated pixel to inaccurately report the image intensity at that point. Bleaching changes the scale factor for the image from a simple proportionality to the exposure time. The Invention uses a scatter-gram algorithm approach to eliminate most errors from these two problems. The scatter-gram algorithm can be applied in a point-by-point fashion when combining images, or in a spot-by-spot fashion when combining quantified data from cDNA spots.

Figure 5:
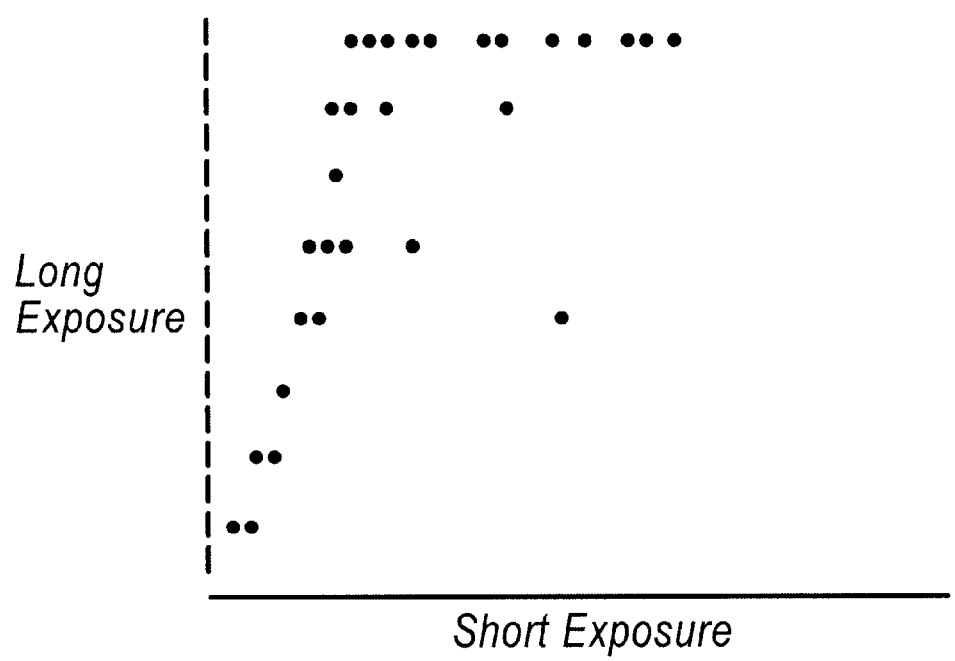
FIG. 5 is an example of a plot from a sample scatter-gram algorithm.

In a scatter-gram algorithm, co-located pixel values (or spot values) are plotted on an X-Y graph, using the short exposure value for X and the long for Y. A sample plot appears at FIG. 5. In that example, the plateau represents values that are saturated in the long exposure, and the sloping region represents values that are valid in both exposures. A line is fit to the sloping region, and the slope of the line gives the true exposure ratio, corrected for bleaching effects and any inaccuracy in the exposure times. For points close to the fit line, final image values are calculated from values from both exposures, using the slope (and offset) of the fit line. For points well off the fit line, such as the plateau points and other outliers, values are taken only from the short exposure. There are no "indeterminate" points. Thresholds may be used for determining outliers before fitting the line. This algorithm works equally well for raw pixels values and for quantified spot values, as long as the spot quantifier can determine values (saturated or not) for all spots co-located on both exposures.

In one embodiment, an anti-blooming camera is used to eliminate errors from blooming artifacts in long exposure images that contain saturated pixels.

Preferred embodiments of the present Invention have been disclosed. A person of ordinary skill in the art would realize, however, that certain modifications would come within the teachings of this Invention, and the following claims should be studied to determine the true scope and content of the invention. In addition, the methods and structures of the present invention can be incorporated in the form of a variety of embodiments, only a few of which are described herein. It will be apparent to the artisan that other embodiments exist that do not depart from the spirit of the invention. Thus, the described embodiments are illustrative and should not be construed as restrictive.

What is claimed is:

1. A system for automated imaging of samples, comprising:
   a. an automated stage for storage and transportation of one or more of said samples in a viewing area
   b. an arc lamp providing a source of excitation light;
   c. a first optical subsystem transmitting said excitation light to a sample in said viewing area, wherein said first optical subsystem includes a telescope;
   d. an excitation filter wheel containing one or more excitation filters to select the desired wavelength of said excitation light;
   e. a camera;
   f. a second optical subsystem transmitting emission light from said sample exposed to said excitation light to said camera; and
   g. an emission filter wheel containing one or more emission filters to select the desired wavelength of said emission light.

2. A system for automated imaging of samples, comprising:
   a. an automated stage for storage and transportation of one or more of said samples in a viewing area
   b. an arc lamp providing a source of excitation light;
   c. a first optical subsystem transmitting said excitation light to a sample in said viewing area, wherein said first optical subsystem includes a prism;
   d. an excitation filter wheel containing one or more excitation filters to select the desired wavelength of said excitation light;
   e. a camera;
   f. a second optical subsystem transmitting emission light from said sample exposed to said excitation light to said camera; and
   g. an emission filter wheel containing one or more emission filters to select the desired wavelength of said emission light.

3. The system of claim 2, wherein said first optical system includes a mask on said prism.

4. The system of claim 2, wherein said excitation light from said arc lamp is collimated.

5. The system of claim 4, including means for correction mapping in order to cancel the effect of nonuniform illumination of said sample.

6. The system of claim 4, wherein said excitation light from said arc lamp is collimated by one or more mirrors.

7. The system of claim 4, wherein said excitation light from said arc lamp is collimated by a telescope.

8. The system of claim 4, wherein said camera is a CCD camera.

9. The system of claim 4, including a shutter to control or prevent transmission of said excitation light.

10. The system of claim 4, wherein said stage contains one or more holes to act as means to reduce the amount of scattered excitation light.

11. The system of claim 4, wherein said second optical subsystem contains an imaging lens.

12. The system of claim 11, wherein said imaging lens contains a plurality of lens elements.

13. The system of claim 12, wherein said imaging lens elements include air-spaced lens elements.

14. The system of claim 13, wherein said imaging lens elements include three singles and one doublet.

15. The system of claim 11, wherein said imaging lens has a focal length of approximately 116.6 mm and a speed of approximately F/5.3.

16. The system of claim 11, wherein said imaging lens is color corrected and corrected for distortion.

17. The system of claim 4, wherein said second optical subsystem contains a camera lens.

18. The system of claim 4, wherein said camera lens has a focal length of approximately 28 mm and a speed of approximately F/1.4.

19. The system of claim 11, wherein said second optical subsystem contains a camera lens with a pupil plane coincident to the pupil plane of said imaging lens.

20. The system of claim 4, wherein said second optical subsystem contains a parallel path region permitting the introduction of said emission filters.

21. The system of claim 20, wherein said emission filter wheel is tilted at an angle away from perpendicular to said emission light.

22. The system of claim 20, wherein said second optical subsystem includes an imaging lens to allow said parallel path region.

23. The system of claim 4, wherein said excitation and emission filters, when crossed, have a blocking of approximately $10_8$ to $>10_{10}$ over the spectrum of said arc lamp.

24. The system of claim 4, including means for automated field-variation correction.

25. The system of claim 4, including means for automated exposure of said samples.

26. The system of claim 4, including means for extended dynamic range imaging using multiple exposures of said samples.

27. The system of claim 26, including means for bleaching and blooming correction of said extend dynamic range imaging.

28. The system of claim 27, wherein said means includes application of a scatter-gram algorithm.

29. The system of claim 2, 25, or 26, including an anti-blooming camera for artifact reduction.

30. The system of claim 4, wherein said arc lamp is a xenon lamp.

31. The system of claim 4, wherein said arc lamp is a mercury arc lamp.

32. The system of claim 4, wherein said arc lamp is a pulsed arc lamp.

33. The system of claim 4, wherein said arc lamp is a UV and visible light emitting arc lamp.

34. The system of claim 4, wherein said samples comprise one or more DNA microarrays.

35. The system of claim 34, wherein said microarrays include one or more fluorescent-labeled compounds.

36. The system of claim 4, wherein said samples comprise one or more electrophoresis gels.

37. The system of claim 4, wherein said samples comprise one or more chromatography plates.

38. The system of claim 4, wherein said samples comprise one or more radioisotopes.

39. The system of claim 4, wherein said samples comprise one or more histological samples.

40. The system of claim 4, wherein said samples comprise one or more toxicology samples.

41. The system of claim 4, wherein said samples comprise one or more arrays of one or more proteins.

42. The system of claim 41, where said array includes one or more antibodies.

43. A system for automated imaging of samples, comprising:
  a. an automated stage for storage and transportation of one or more of said samples in a viewing area
  b. an arc lamp providing a source of excitation light;
  c. a first optical subsystem transmitting said excitation light to a sample in said viewing area;
  d. an excitation filter wheel containing one or more excitation filters to select the desired wavelength of said excitation light;
  e. a camera;
  f. a second optical subsystem transmitting emission light from said sample exposed to said excitation light to said camera; and
  g. an emission filter wheel containing one or more emission filters to select the desired wavelength of said emission light,
wherein one or more of said excitation and emission filters block excitation light with an efficiency greater than OD8.

44. A system for automated imaging of samples, comprising:
  a. an automated stage for storage and transportation of one or more of said samples in a viewing area
  b. an arc lamp providing a source of excitation light;
  c. a first optical subsystem transmitting said excitation light to a sample in said viewing area;
  d. an excitation filter wheel containing one or more excitation filters to select the desired wavelength of said excitation light;
  e. a camera;
  f. a second optical subsystem transmitting emission light from said sample exposed to said excitation light to said camera; and
  g. an emission filter wheel containing one or more emission filters to select the desired wavelength of said emission light,
wherein dark field illumination is used to further reduce excitation signal noise.

45. A system for automated imaging of samples, comprising:
  a. an automated stage for storage and transportation of one or more of said samples in a viewing area
  b. an arc lamp providing a source of excitation light;
  c. a first optical subsystem transmitting said excitation light to a sample in said viewing area;
  d. an excitation filter wheel containing one or more excitation filters to select the desired wavelength of said excitation light;
  e. a camera;
  f. a second optical subsystem transmitting emission light from said sample exposed to said excitation light to said camera; and
  g. an emission filter wheel containing one or more emission filters to select the desired wavelength of said emission light;
wherein the depth of field is sufficient to allow for the protection of the sample under a glass cover slip.

46. A system for automated imaging of samples, comprising:
  a. an automated stage for storage and transportation of one or more of said samples in a viewing area
  b. an arc lamp providing a source of excitation light;
  c. one or more mirrors to reflect said excitation light from said arc lamp;
  d. a first optical subsystem transmitting said excitation light to a sample in said viewing area, comprising a telescope and a prism;

e. an excitation filter wheel containing one or more excitation filters to select the desired wavelength of said excitation light;

f. a camera;

g. a second optical subsystem transmitting emission light from said sample exposed to said excitation light to said camera, comprising an imaging lens and a camera lens;

h. an emission filter wheel containing one or more emission filters to select the desired wavelength of said emission light; and i. a parallel path region permitting introduction of said emission filter wheel into said emission light path.

47. The system of claim 46, wherein said samples comprise one or more histological samples.

48. The system of claim 46, wherein said samples comprise one or more toxicology samples.

49. The system of claim 46, wherein said camera is a CCD camera.

50. The system of claim 46, including a shutter to control or prevent transmission of said excitation light.

51. The system of claim 46, wherein said stage contains one or more holes to act as means to reduce the amount of scattered excitation light.

52. The system of claim 46, wherein said emission filter wheel is tilted at an angle away from perpendicular to said emission light.

53. The system of claim 46, including means for automated field-variation correction.

54. The system of claim 46, including means for automated exposure of said samples.

55. The system of claim 46, including means for extended dynamic range imaging using multiple exposures of said samples.

56. The system of claim 46, including means for bleaching and blooming correction of said extend dynamic range imaging.

57. The system of claim 56, wherein said means includes application of a scatter-gram algorithm.

58. The system of claim 46, including means for correction mapping in order to cancel the effect of nonuniform illumination of said sample.

59. The system of claim 46, 54, or 55, including an anti-blooming camera for said artifact reduction.

60. The system of claim 46, wherein said samples comprise one or more DNA microarrays.

61. The system of claim 60, wherein said microarrays include one or more fluorescent-labeled compounds.

62. The system of claim 46, wherein said samples comprise one or more arrays of one or more proteins.

63. The system of claim 62, where said array includes one or more antibodies.

64. The system of claim 46, wherein said samples comprise one or more electrophoresis gels.

65. The system of claim 46, wherein said samples comprise one or more chromatography plates.

66. The system of claim 46, wherein said samples comprise one or more radioisotopes.

* * * * *